Sept. 20, 1955  G. W. SLOPA ET AL  2,718,026
SELF-CLOSING ADJUSTABLE DOOR HINGE
Filed Dec. 23, 1954
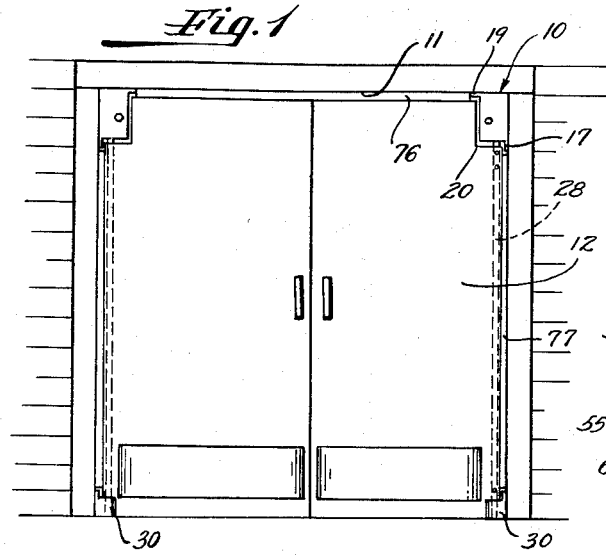
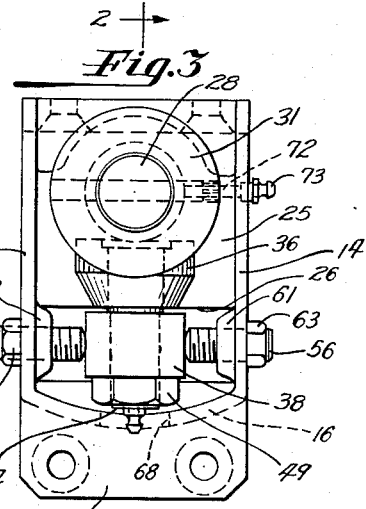
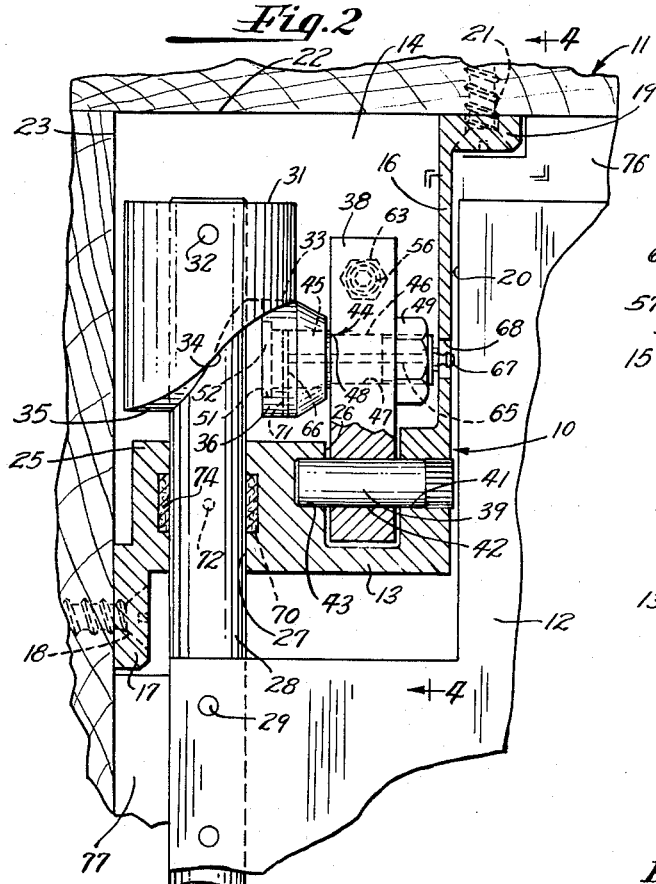
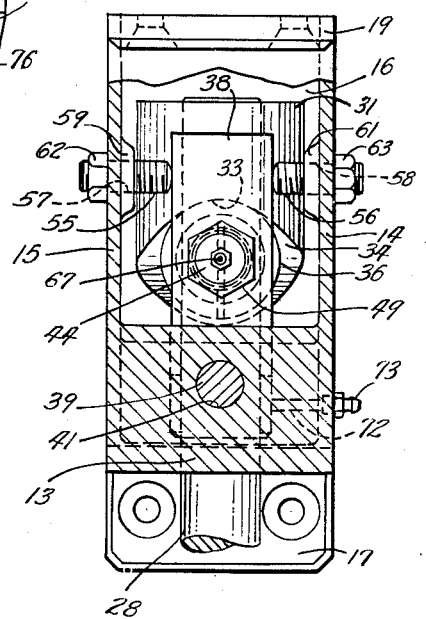
Inventor
George W. Slopa and
Robert E. Slopa
By McCanna and Morsbach
Attys.

United States Patent Office 2,718,026
Patented Sept. 20, 1955

2,718,026

SELF-CLOSING ADJUSTABLE DOOR HINGE

George W. Slopa and Robert E. Slopa, Harvard, Ill.

Application December 23, 1954, Serial No. 477,272

6 Claims. (Cl. 16—154)

This invention relates to door operators and more particularly to a door operator in which closing movement of the door is effected by gravity.

The gravity actuated door operator structure of the present invention in general includes a cam arranged for connection to a vertically disposed door supporting shaft and a roller which engages the curved track on the cam to raise the door as the latter is opened so that the weight of the door is effective to urge the latter to its closed position, the cam track being formed with a seat which, when it engages the roller, inhibits further swinging movement of the door to thereby normally maintain the door in a closed position.

It is an important object of this invention to provide a novel gravity actuated door operator structure wherein the angular position in which the door is normally maintained can be accurately and positively adjusted after the operator and door have been installed in the door frame and without necessitating disassembly of any parts of the operator.

Another object of this invention is the provision of a door operator structure of the character described which is ruggedly constructed and so arranged as to brace the door frame when the operator is mounted thereon to thereby provide a more rigid and durable door suspension capable of withstanding rough usage.

Still another object of this invention is the provision of a door operator structure of the character described having a novel housing adapted to be mounted in the upper corner of the door frame with the walls of the housing extending contiguous to the door frame to form a complete enclosure therewith for the movable parts of the operator and to close the interface between the operator and the door frame thereby minimizing the openings between the door and the frame around the operator structure through which air may pass.

A further object of this invention is the provision of a gravity type door operator adapted for use in low ambient temperatures and particularly in the provision of an operator of this type arranged to provide adequate lubrication to all moving parts without requiring or permitting the accumulation of a large mass of lubricant in contact with the moving parts which would impede operation of the door operator at low ambient temperatures.

These, together with various ancillary objects and advantages of this invention will be more readily appreciated as the same becomes better understood by reference to the following detailed description when taken in connection with the accompanying drawings wherein:

Figure 1 is a front elevational view of a door and frame structure having the operator of the present invention mounted thereon;

Fig. 2 is a vertical sectional view through the door operator taken on the plane 2—2 of Fig. 3;

Fig. 3 is a top plan view of the door operator; and

Fig. 4 is a vertical sectional view of the operator taken on the plane 4—4 of Fig. 2.

The gravity actuated door operator structure of the present invention, although adapted generally for use with swinging doors, is specifically intended for use in vestibule doors in a refrigeration chamber. The vestibule doors in a refrigeration chamber are provided in addition to the main door, to provide an easily openable and automatically closing closure for the chamber. In the larger refrigeration chambers, these doors are often opened by bumping the door with the truck which carries the foodstuffs into and out of the chamber, and the doors are thus subjected to rough usage requiring a rigid and durable door suspension. Additionally, the door operator is subjected to low ambient temperatures at which the lubricant tends to become sticky, and it is therefore essential to arrange the door operator so as to permit operation under these conditions.

As shown in Fig. 1, the door operator, designated generally by the numeral 10 is adapted to be mounted in the upper corner of a door frame 11 to swingably support a door 12. The door operator 10 includes a housing having a bottom wall 13, opposed side walls 14 and 15 and an arcuate end wall 16 which is formed integrally with the bottom and side walls. A mounting flange 17 is formed on the inner end of the bottom wall remote from the end wall 16, for attachment to the side of the door frame as by suitable fasteners 18 and a second mounting flange 19 is formed on the upper end of the end wall and arranged to be secured to the top of the frame structure as by fasteners 21. In this manner, the housing of the door operator, when attached to the door frame, forms a rigid brace for the upper corner of the frame to rigidify the latter. The side walls 14 and 15 of the housing extend so that the upper and rear edges 22 and 23 thereof respectively extend contiguous to the frame members to thereby form a complete enclosure for the moving parts of the door operator. Moreover, this arrangement of the side walls of the housing also effectively seals the juncture between the door operator housing and the frame so that the passage of cool air from the refrigerating chamber thereby is inhibited.

The door operator is preferably constructed so as to also function as a hinge for the upper end of the door. For this purpose the bottom wall 13 of the housing is formed with an enlarged boss 25 which extends upwardly in the housing in spaced relation to the end wall 16 thereof and forms a guide slot 26 therebetween. The boss 25 is formed with a vertically disposed bore 27 through which the shaft 28 slidably and rotatably extends, and the door 12 is fixedly attached to the shaft, as by pins 29, a notch 20 being formed in the upper corner of the door to accommodate the door operator. Conveniently, the shaft extends the full length of the door and is slidably and rotatably journaled at its lower end in the hinge block 30 (see Fig. 1). A cam member 31 is secured to the upper end of the door supporting shaft 28, within the housing, as by a pin 32 and the lower edge of the cam member is formed with a cam surface including a seat 33 and an annular cam track 34 which curves downwardly from the seat to a low point on the cam member indicated at 35. A roller 36 is mounted within the door operator housing and engages the lower edge of the cam member to support the latter thereon. The cam track 34 rides over the roller, as the door is swung to its open position, to raise the door supporting shaft 28 and the door 12 and, when the door is released, the weight of the door, acting through the cam on the roller, urges the door to a position in which the seat 33 on the cam again rests on the roller.

In accordance with the present invention, the roller 36 is mounted for adjustment relative to the housing to thereby permit the closed position of the door to be adjusted. As best shown in Fig. 2, a roller support arm 38 has its lower end disposed in the guide slot 26 and a pivot pin 39 extends through aligned bores 41 and 42 in the end wall 16 and the support arm 38, respectively, and into a socket 43 formed in the enlarged boss 25 to thereby pivotally support the arm 38 for movement about an axis which extends radially of the door supporting shaft 28. A stub shaft 44 is provided on the support arm 38 to rotatably support the roller 36 thereon and includes an enlarged end portion 45 on which the roller is supported and a relatively smaller shank portion 46 which is received in a bore 47 in the support arm 38. The enlarged end portion 45 and the shank portion 46 form a shoulder 48 therebetween and a nut 49 is threaded on the outer end of the shank to draw the shoulder against the support arm and thereby lock the stub shaft to the arm. The roller 36 is rotatably disposed on the enlarged end of the stub shaft and is formed with a counterbore 51 which receives the retaining head 52 on the end of the stub shaft.

The roller is thus mounted for adjustment in a direction laterally of the side walls 14 and 15 of the housing and provision is made for positively adjusting the position of the support arm 38 and the roller 36 relative to the housing to thereby adjust the angular position of the door at which the seat 33 on the cam member rests on the roller. As best shown in Figs. 3 and 4, this adjustment can be made externally of the housing by means of the opposed adjusting screws 55 and 56 which threadedly extend through the threaded bores 57 and 58 formed in the end walls 14 and 15 and in the reinforcing bosses 59 and 61. The adjusting screws extend into engagement with opposite sides of the roller support arm at a point spaced above the stub shaft 48 to permit accurate and positive adjustment of the position of the roller 36 relative to the housing. Suitable lock nuts 62 and 63 are provided to lock the adjusting screws and the support arm 38 in their adjusted position.

In the use of the door operator structure in environments in which low ambient temperatures are incurred, it is necessary to provide an adequate but not excessive amount of lubrication to the moving parts of the hinge. Since lubricants become thick and sticky at low temperatures, a large quantity of lubricant in contact with the moving parts of the hinge would greatly impede rapid opening and closing movement of the door, as occurs when the door 12 is bumped by the truck which carries the foodstuffs into and out of the refrigeration chamber. As is apparent from the drawings, the reciprocable door supporting shaft and cam are spaced from the side and end walls of the housing so that any lubricant which clings to the side walls of the shaft or cam or which accumulates on the end thereof cannot impede movement of the cam and shaft. In order to provide the requisite lubricant to the several parts, lubricant is supplied to the roller 36 and to the cam track 34 on the cam by way of a lubrication passage 65 which extends longitudinally of the stub shaft 44 from the end thereof remote from the roller to a point spaced from the head 52, one or more lateral lubrication passages 66 communicating with the longitudinal passage 65 to convey the lubricant to the inner periphery of the roller 36 to lubricate the same. Lubricant is preferably forced into the lubrication passages under pressure, and for this purpose a pressure fitting 67 is mounted on the outer end of the stub shaft and extends through an access opening 68 in the end wall 16. The lubricant which is extruded from between the roller and stub shaft will flow onto the outer surface of the roller and pass onto the periphery of the roller to thereby provide a limited amount of lubricant for the outer periphery of the roller and the cam track 34. If desired, one or more radial passages 71 may be provided in the roller to convey lubricant from between the roller and the stub shaft to thereby augment the flow of lubricant to the outer periphery of the roller.

Lubricant may also be supplied to the lubricant reservoir formed by the annular recess 70 in the boss 25 through a lubricant passage 72 which extends from the recess 70 through the side wall of the housing, a suitable pressure fitting 73 being provided at the outer end of the passage 72. A lubricant retaining washer 74, formed of a material such as felt, may be provided in the recess to retain the lubricant in the reservoir. In this manner an adequate amount of lubricant is provided on each of the moving parts of the door operator and in such a manner that a large mass of lubricant is neither required to provide adequate lubrication nor is a large amount of lubricant allowed to collect on any of the relatively moving parts which would produce a dash pot effect and impede reciprocation of the shaft 28 and cam 31.

From the foregoing it is apparent that the hinge structure of the present invention is of rugged construction and is arranged to diagonally brace the corner of the door frame 11 to thereby provide a more rigid and durable door suspension which can withstand the rough usage to which these doors are often subjected. Moreover, since the housing extends contiguous to the door frame and forms a complete enclosure therewith for the moving parts of the door operator, the splashing of lubricant from the operator, as the door is rapidly opened and closed, is prevented. This is of particular importance in those applications of the door operator, such as in the vestibule doors of a refrigeration chamber, wherein the foodstuffs pass through the doors. Moreover, the housing effectively seals the juncture between the door operator and the frame so that the passage of air is minimized. The end wall 16 of the housing is in the form of a semi-cylinder disposed concentrically of the shaft 28 so that the adjacent edge of the notch 20 in the door may be disposed closely adjacent to the end wall of the hinge to limit passage of air thereby. Resilient wipers 76 and 77 are attached to the tops and sides of the frame to engage the adjacent edges of the door, when the latter is closed and form a seal thereat.

By reason of the disclosed lubrication system, an adequate amount of lubrication is provided to the roller and to the cam track to limit wear, without requiring a large mass of lubricant into which the cam may move. Since the cam is spaced from the side and end walls of the housing, any excess lubricant may drain therefrom to the bottom of the housing and any excessive accumulations of lubricant over a period of years will merely drip from the access opening in the end wall, giving indication that the hinge should be dismounted for cleaning.

Although a specific embodiment of the invention has been disclosed in the accompanying drawing and described in detail in the foregoing specification, it is to be understood that the invention is capable of embodying a wide variety of modifications in detail structure without departing from the spirit of the invention or scope of the appended claims.

We claim:

1. A gravity type door operator comprising a stationary support member, a vertically disposed shaft slidably and rotatably journaled in said support member, a cam member on the upper end of said shaft having its lower edge formed with a downwardly facing seat and an annular cam track curving downwardly from the seat, a roller support arm having one end thereof pivotally mounted on said support member for movement about an axis extending radially of said shaft, a roller rotatably mounted on said arm at a point thereon spaced from the pivoted end thereof, said roller engaging the lower edge of said cam member to support the shaft, and manually adjustable means on said support member engaging said arm at a point spaced from the pivoted end thereof for positively adjusting said arm about its pivot to thereby adjust the angular position of the shaft at which said seat engages the roller.

2. A gravity type door operator comprising a housing having a bottom wall, opposed side walls and an end wall connecting the side and bottom walls, a vertically disposed shaft slidably and rotatably journaled in said bottom wall and extending into said housing, a cam member on the upper end of said shaft having its lower edge formed with a downwardly facing seat and an annular cam track curving downwardly from the seat, a roller support arm mounted on said housing for movement laterally of the side walls, a roller rotatably mounted on said arm and engaging the lower edge of said cam member to effect raising and lowering of the shaft as the cam track moves over the roller, and adjusting members threadedly extending through said side walls and engaging said arm to positively move said arm laterally of said side walls and thereby adjust the angular position of the shaft at which said seat engages the roller.

3. A gravity type door operator comprising a housing having a bottom wall, opposed side walls and an end wall connected to said bottom and side walls, an enlarged boss formed on said bottom wall and extending upwardly in said housing in spaced relation to said end wall to provide a guide slot therebetween, a vertically disposed shaft slidably and rotatably journaled in said boss, a cam member on the upper end of said shaft having its lower edge formed with a downwardly facing seat and an annular cam track curving downwardly from the seat, an arm having one end thereof disposed in said guide slot, a pivot pin extending through said end wall and into said boss for pivotally supporting said one end of the arm, a roller rotatably mounted on said arm spaced from said one end thereof and engaging the lower edge of said cam member to effect raising and lowering of the shaft as the cam track moves over the roller, and adjusting members threadedly extending through said side walls and engaging said arm to positively move the arm about its pivot and thereby adjust the angular position of the shaft at which said seat engages said roller.

4. A gravity type door operator comprising a housing adapted to be mounted in the upper corner of a door frame, said housing including a bottom wall, opposed side walls and an end wall connected to the side and bottom walls, mounting flanges on the upper end of the end wall and at the end of the bottom wall remote from the end wall for attaching the housing to the door frame, said side walls being shaped to extend contiguous to the door frame to form an enclosure therewith, a vertically disposed shaft slidably and rotatably journaled in said bottom wall and extending into said housing, a cam member on the upper end of said shaft having its lower edge formed with a downwardly facing seat and an annular cam track curving downwardly from the seat, a stub shaft mounted in said housing between said end wall and said vertical shaft and extending transverse to said vertical shaft, a roller rotatably mounted at one end of said stub shaft and engaging the lower edge of the cam member to raise and lower the shaft as the latter is rotated, said stub shaft having a lubrication passage herein extending from the other end of the stub shaft to the inner periphery of the roller to convey lubricant thereto whereby the lubricant which flows out from between the stub shaft and roller passes onto the outer periphery of the roller to lubricate the cam track.

5. A gravity type door operator comprising a housing adapted to be mounted in the upper corner of a door frame, said housing including a bottom wall, opposed side walls and an end wall connected to the side and bottom walls, mounting flanges on the upper end of the end wall and at the end of the bottom wall remote from the end wall for attaching the housing to the door frame, a vertically disposed shaft slidably and rotatably journaled in said bottom wall and extending into said housing, a cam on the upper end of said shaft having its lower edge formed with a downwardly facing seat and an annular cam track curving downwardly from the seat, a roller support arm mounted on the housing between said shaft and said end wall for movement laterally of said side walls, a stub shaft carried by said arm having one end disposed adjacent said end wall and the other end spaced from said shaft, a roller rotatably mounted on said other end of said stub shaft and engaging the lower edge of said cam member to raise and lower the shaft as the latter is rotated said stub shaft having a lubrication passage therein extending from said one end thereof and opening at its other end at one side of said stub shaft intermediate the ends of said roller to convey lubricant thereto whereby the lubricant which leaks from between the stub shaft and roller passes onto the outer periphery of the roller to lubricate the cam track, said side walls being shaped to extend contiguous to the door frame to form an enclosure therewith and prevent splashing of lubricant out of said housing as the hinge is operated.

6. A gravity type door operator comprising a housing adapted to be mounted in the upper corner of a door frame, said housing including a bottom wall, opposed side walls and an end wall connected to the side and bottom walls, mounting flanges on the upper end of the end wall and at the end of the bottom wall remote from the end wall for attaching the housing to the door frame, a vertically disposed shaft slidably and rotatably journaled in said bottom wall and extending into said housing, a cam on the upper end of said shaft having its lower edge formed with a downwardly facing seat and an annular cam track curving downwardly from the seat, a roller support arm mounted on said housing between said shaft and said end wall for movement laterally of said side walls, a stub shaft carried by said arm having one end disposed adjacent said end wall and the other end spaced from said shaft, a roller rotatably mounted on said other end of said stub shaft and engaging the lower edge of said cam member to raise and lower the shaft as the latter is rotated said stub shaft having a lubrication passage therein extending from said one end thereof and opening at its other end at one side of said stub shaft intermediate the ends of said roller to convey lubricant thereto whereby the lubricant which leaks from between the stub shaft and roller passes onto the outer periphery of the roller to lubricate the cam track, said side walls being shaped to extend contiguous to the door frame to form an enclosure therewith and prevent splashing of lubricant out of said housing as the hinge is operated, said end wall having an opening therein registering with said one end of the stub shaft to provide access to the lubrication passage therein, said roller support arm overlying said opening to prevent splashing of lubricant therethrough from said cam and roller.

References Cited in the file of this patent

UNITED STATES PATENTS

| | | |
|---|---|---|
| 805,243 | Dunn | Sept. 3, 1907 |
| 1,155,452 | Sundh | Oct. 5, 1915 |